US010309734B2

(12) United States Patent
Mockry et al.

(10) Patent No.: US 10,309,734 B2
(45) Date of Patent: Jun. 4, 2019

(54) AIR-TO-AIR HEAT EXCHANGER BYPASS FOR WET COOLING TOWER APPARATUS AND METHOD

(71) Applicant: SPX Cooling Technologies, Inc., Overland Park, KS (US)

(72) Inventors: Eldon F. Mockry, Lenexa, KS (US); Kenneth P. Mortensen, Bonner Springs, KS (US); Craig J. Hickman, Overland Park, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 339 days.

(21) Appl. No.: 14/468,970

(22) Filed: Aug. 26, 2014

(65) Prior Publication Data

US 2015/0069643 A1 Mar. 12, 2015

Related U.S. Application Data

(60) Provisional application No. 61/877,005, filed on Sep. 12, 2013.

(51) Int. Cl.
*F28F 25/12* (2006.01)
*F28C 1/14* (2006.01)
(Continued)

(52) U.S. Cl.
CPC .............. *F28F 25/12* (2013.01); *F28C 1/00* (2013.01); *F28C 1/14* (2013.01); *F28C 1/16* (2013.01);
(Continued)

(58) Field of Classification Search
CPC ........ F28F 25/12; F28F 25/02; F28F 2210/04; F28C 1/14; F28C 2001/145; F28C 1/16;
(Continued)

(56) References Cited

U.S. PATENT DOCUMENTS 3,367,413 A 2/1968 Trevor et al.
3,754,738 A 8/1973 Blazer et al.
(Continued)

FOREIGN PATENT DOCUMENTS

DE 3030439 A1 3/1982
EP 0 172 403 2/1986
(Continued)

OTHER PUBLICATIONS

Paul A. Lindahl, Jr., et al., "Plume Abatement and Water Conservation with the Wet/Dry Cooling Tower",Technical Paper No. TP93 01 of the Cooling Tower Institute 1993 Annual Meeting.
(Continued)

*Primary Examiner* — Stephen Hobson
(74) *Attorney, Agent, or Firm* — BakerHostetler

(57) ABSTRACT

A cooling tower having an evaporative media along with a liquid distribution system that distributes hot liquid over the evaporative media. The cooling tower includes a pair of heat exchanger modules that each have a first set of passageways in fluid communication with a first flow duct and a second set of passageways in fluid communication with a second flow duct. The heat exchanger module transfers heat from a first air stream into a second air stream. The cooling tower further includes a first bypass flow path that extends between the first heat exchanger module and the second heat exchanger module whereby a bypass door regulates airflow there through.

9 Claims, 10 Drawing Sheets

(51) Int. Cl.
*F28F 25/02* (2006.01)
*F28C 1/00* (2006.01)
*F28C 1/16* (2006.01)

(52) U.S. Cl.
CPC .......... *F28F 25/02* (2013.01); *F28F 2210/04* (2013.01); *Y10S 165/135* (2013.01); *Y10S 165/327* (2013.01); *Y10S 165/355* (2013.01); *Y10S 165/90* (2013.01)

(58) Field of Classification Search
CPC ...... F28C 1/00; Y10S 165/90; Y10S 165/355; Y10S 165/327; Y10S 165/135
See application file for complete search history.

(56) References Cited

U.S. PATENT DOCUMENTS

| | | | |
|---|---|---|---|
| 4,076,771 A * | 2/1978 | Houx, Jr. | F28C 1/14 165/900 |
| 4,418,023 A | 11/1983 | Dolan | |
| 4,662,902 A | 5/1987 | Meyer-Pittroff | |
| 5,449,036 A | 9/1995 | Genge et al. | |
| 5,585,047 A * | 12/1996 | Mortensen | A62C 3/00 169/54 |
| 5,775,409 A | 7/1998 | Goto et al. | |
| 5,816,315 A | 10/1998 | Stark | |
| 5,944,094 A | 8/1999 | Kinney, Jr. et al. | |
| 6,260,830 B1 | 7/2001 | Harrison et al. | |
| 6,684,943 B2 | 2/2004 | Dobbs et al. | |
| 7,128,310 B2 | 10/2006 | Mockry et al. | |
| 8,833,741 B2 | 9/2014 | Mockry et al. | |
| 2003/0071373 A1 * | 4/2003 | Hubbard | F28C 1/14 261/111 |
| 2004/0080060 A1 | 4/2004 | Mockry et al. | |
| 2005/0077637 A1 * | 4/2005 | Mockry | F28C 1/14 261/112.1 |
| 2011/0113798 A1 | 5/2011 | Pichai | |
| 2011/0227236 A1 * | 9/2011 | Vouche | F28B 1/06 261/128 |
| 2013/0113127 A1 | 5/2013 | Yang et al. | |
| 2013/0228941 A1 | 9/2013 | Bogh et al. | |
| 2015/0068708 A1 | 3/2015 | Mockry et al. | |
| 2017/0003078 A1 * | 1/2017 | Vadder | F28F 25/08 |

FOREIGN PATENT DOCUMENTS

| | | |
|---|---|---|
| EP | 0264316 A1 | 4/1988 |
| WO | 2012114134 A1 | 8/2012 |

OTHER PUBLICATIONS

O.K. Buros, "The Desalting ABC's", International Desalination Association, modified and reproduced by Research Department Saline Water Conversion Corporation, 1990.

Lu, et al., "Zero Discharge Desalination", Proceedings from the ADA North American Biennial Conference and Exposition, Aug. 2000.

Baumgartner, et al., "Open Multiple Effect Desalination with Low Temperature Process Heat", International Symposium on Desalination and Water Re-Use, vol. 4, 1991.

European Search Report issued in European Patent Application No. 14184540.4 dated Jan. 21, 2015.

* cited by examiner

AIR-TO-AIR HEAT EXCHANGER BYPASS FOR WET COOLING TOWER APPARATUS AND METHOD

CROSS-REFERENCE

This application is related to U.S. Provisional Patent Application Ser. No. 61/877,005, titled "AIR-TO-AIR HEAT EXCHANGER BYPASS FOR WET COOLING TOWER APPARATUS AND METHOD," filed Sep. 12, 2013, the disclosures of each which are hereby incorporated by reference in their entirety.

FIELD OF THE INVENTION

The present invention relates generally to plume abatement for cooling towers or other heat rejection devices and the like. More particularly, the present invention relates to method and apparatus for a cost effective and efficient plume abatement in cooling towers.

BACKGROUND OF THE INVENTION

In electricity generation using steam driven turbines, water is heated by a burner to create steam which drives a turbine to creates electricity. In order to minimize the amount of clean water necessary for this process, the steam must be converted back into water, by removing heat, so that the water can be reused in the process. In air conditioning systems for large buildings, air inside the building is forced passed coils containing a cooled refrigerant gas thereby transferring heat from inside the building into the refrigerant gas. The warmed refrigerant is then piped outside the building where the excess heat must be removed from the refrigerant so that the refrigerant gas can be re-cooled and the cooling process continued.

In both of the foregoing processes, and numerous other processes that require the step of dissipating excess heat, cooling towers have been employed. In wet type cooling towers, water is pumped passed a condenser coil containing the heated steam, refrigerant, or other heated liquid or gas, thereby transferring heat into the water. The water is then pumped to the heat exchange section of the cooling tower and sprayed over a cooling tower media comprised of thin sheets of material or splash bars. As the water flows down the cooling tower media, ambient air is forced passed the heated water and heat is transmitted from the water to the air by both sensible and evaporative heat transfer. The air is then forced out of the cooling tower and dissipated into the surrounding air.

Cooling towers are highly efficient and cost effective means of dissipating this excess heat and thus are widely used for this purpose. A recognized drawback to cooling towers, however, is that under certain atmospheric conditions a plume can be created by moisture from the heated water source evaporating into the air stream being carried out of the top of the cooling tower. Where the cooling tower is very large, as in the case of power plants, the plume can cause low lying fog in the vicinity of the cooling tower. The plume can also cause icing on roads in the vicinity of the cooling tower where colder temperatures cause the moisture in the plume to freeze.

Efforts have therefore been made to limit or eliminate the plume caused by cooling towers. Such efforts include, for example, a plume abated cooling tower in which ambient air, in addition to being brought in at the bottom of the tower and forced upwards through a fill pack as hot water is sprayed down on the fill pack, is brought into the cooling tower through isolated heat conductive passageways below the hot water spray heads. These passageways which are made from a heat conductive material such as aluminum, copper, etc., allow the ambient air to absorb some of the heat without moisture being evaporated into the air. At the top of the tower the wet laden heated air and the dry heated air are mixed thereby reducing the plume.

Another example is a plume prevention system in which the hot water is partially cooled before being provided into the cooling tower. The partial cooling of the hot water is performed using a separate heat exchanger operating with a separate cooling medium such as air or water. The separate heat exchanger reduces the efficiency of the cooling tower and thus should only be employed when atmospheric conditions exist in which a plume would be created by the cooling tower.

Another example of a system designed to reduce plume in a wet type cooling tower can be found in the "Technical Paper Number TP93-01"of the Cooling Tower Institute 1993 Annual Meeting, "Plume Abatement and Water Conservation with the Wet/Dry Cooling Tower," Paul A. Lindahl, Jr., et al. In the system described in this paper, hot water is first pumped through a dry air cooling section where air is forced across heat exchange fins connected to the flow. The water, which has been partially cooled, is then sprayed over a fill pack positioned below the dry air cooling section and air is forced through the fill pack to further cool the water. The wet air is then forced upwards within the tower and mixed with the heated dry air from the dry cooling process and forced out the top of the tower.

While the foregoing systems provide useful solutions to the wet cooling tower plume problem, they all require the construction of a complex and costly wet and dry air heat transfer mechanism. Moreover, when such towers operate in "non-plume" abatement mode, more fan energy is expended pull the air through the heat exchange packs, causing the operational costs to the tower to significantly increase. Accordingly, an inexpensive plume abatement method and apparatus is needed wherein the tower may be operated in an "non-abatement" mode without significant cost increase.

Another recognized problem with cooling towers is that the water used for cooling can become concentrated with contaminates. As water evaporates out of the cooling tower, additional water is added but it should be readily recognized that contaminants in the water will become more concentrated because they are not removed with the evaporate. If chemicals are added to the cooling water to treat the water these chemicals can become highly concentrated which may be undesirable if released into the environment. If seawater or waste water is used to replace the evaporated water, a common practice where fresh water is not available or costly, salts and solids in the water can also build up in the cooling water circuit As these contaminants become more concentrated they can become caked in between the thin evaporating sheets diminishing the towers cooling efficiency.

To prevent the foregoing problem it is a regular practice to "blowdown" a portion of the water with the concentrated contaminants and replace it with fresh water from the source. While this prevents the contaminants in the cooling tower water from becoming too concentrated, there may be environmental consequences to discharging water during the blowdown process. Efforts have therefore been made to reduce the water consumption in cooling towers.

U.S. Pat. No. 4,076,771 to Houx, et al. describes the current state-of-the-art in reducing the water consumption in a cooling tower. In the system described in this patent both cooling tower evaporative heat transfer media and a coil section that transfers heat sensibly are provided in the same system. The sensible heat transfer of the coils provides cooling of the process water but does not consume any water.

While the foregoing patent represents a significant advancement over prior art cooling towers, it would be desirable if a mechanism were developed for recapturing water from the plume for replacement back into the cooling tower water reservoir which did not require a coil section for sensible heat transfer.

A separate problem that has been noted is the desalination of sea water, and purification of other water supplies, to create potable drinking water. Numerous approaches have been developed to remove purified water from a moist air stream. The major commercial processes include Multi-Stage Flash Distillation, Multiple Effect Distillation, Vapor Compression Distillation, and Reverse Osmosis. See "The Desalting ABC's", prepared by O. K. Buros for the International Desalination Association, modified and reproduced by Research Department Saline Water Conversion Corporation, 1990. Examples of systems that use low temperature water for desalination or waste heat include the following:

"Zero Discharge Desalination", Lu, et al., Proceedings from the ADA North American Biennial Conference and Exposition, August 2000. This paper provides information on a device that produces fresh water from a cold air stream and a warm moist air stream from a low grade waste heat source. The fresh water is condensed along the walls separating the two air streams. Also, a cold water is sprayed over the warm moist air to enhance condensation.

"Open Multiple Effect Desalination with Low Temperature Process Heat", Baumgartner, et al., International Symposium on Desalination and Water Re-Use, Vol. 4, 1991. This paper provides information on a plastic tube heat exchanger used for desalination that uses cold running water on the inside of the plastic tubes and warm moist air flowing over the exterior of the tubes. The condensate forms on the outside of the cold tubes.

Other cooling towers presently in use are specifically designed for water conservation exclusively. For water conservation, such cooling towers wherein dry air is always flowed through the dry path of the cooling tower condensers to condense vapor from the effluent air. While these towers conserve water, thermal performance of the cooling tower typically is affected as the cooling can become inefficient with respect to heat exchange.

The typical remedies for increased thermal performance are to increase fan power which increases operating costs, to increase the plan area of the tower which increases capital costs, or both. A design that limits increased fan power or plan area to a modest cost increase is very desirable. The foregoing shows that there is a need for cooling towers or the like that can operate in both plume abatement and non-abatement modes effectively and efficiently providing desired heat exchange in all weather conditions without significantly increasing operational costs.

SUMMARY OF THE INVENTION

In one aspect of the invention, a cooling tower having a vertical axis is provided, comprising: an evaporative media located at a first position along the vertical axis; a liquid distribution system that distributes hot liquid over said evaporative media; a first heat exchanger module having a first set of passageways in fluid communication with a first flow duct and a second set of passageways in fluid communication with a second flow duct; a second heat exchanger module having a third set of passageways in fluid communication with a third flow duct and a fourth set of passageways in fluid communication with a fourth flow duct; a first bypass flow path that extends between said first heat exchanger module and said second heat exchanger module; and an air current generator that directs air through said first, second, third, fourth sets of passageways and bypass flow path through the cooling tower.

In another aspect of the invention, a method for reducing the heat content of an air stream in a cooling tower is provided, comprising the steps of: directing a first air stream through a first set of passageways of a first heat exchanger module; directing a second air stream through a separate, second set of passageways of the first heat exchanger module; directing a third air stream through a third set of passageways of a second heat exchanger module and through a first bypass path; directing a fourth air stream through a separate, fourth set of passageways of the second heat exchanger module and through a second bypass path; and transferring heat from said first air stream into said second air stream.

In another aspect of the invention a cooling tower is provide, comprising: means for directing a first air stream through a first set of passageways of a first heat exchanger module; means for directing a second air stream through a separate, second set of passageways of the first heat exchanger module; means for directing a third air stream through a third set of passageways of a second heat exchanger module; means for directing a fourth air stream through a separate, fourth set of passageways of the second heat exchanger module and through a bypass path; and means for transferring heat from said first air stream into said second air stream.

In still another embodiment of the present invention, a cooling tower having a vertical axis is provided, comprising: an evaporative media located at a first position along the vertical axis; a liquid distribution system that distributes hot liquid over said evaporative media; a first heat exchanger module having a first set of passageways in fluid communication with a first flow duct and a second set of passageways in fluid communication with said first flow duct; a second heat exchanger module having a third set of passageways in fluid communication with a second flow duct and a fourth set of passageways in fluid communication with said second flow duct; a lifting device that translates said second heat exchange module to a first position and a second position; and an air current generator that directs air through said first, second, third, fourth passageways and bypass flow path through the cooling tower.

In yet another embodiment of the present invention, a cooling tower having a vertical axis is provided, comprising: an evaporative media located at a first position along the vertical axis; a liquid distribution system that distributes hot liquid over said evaporative media; a first heat exchanger module having a first set of passageways in fluid communication with a first flow duct and a second set of passageways in fluid communication with a second flow duct; a second heat exchanger module having a third set of passageways in fluid communication with a third flow duct and a fourth set of passageways in fluid communication with a fourth flow duct; a wet path damper disposed in said first flow duct that regulates flow through said first duct; and an air current generator that directs air through said flow ducts and said passageways.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
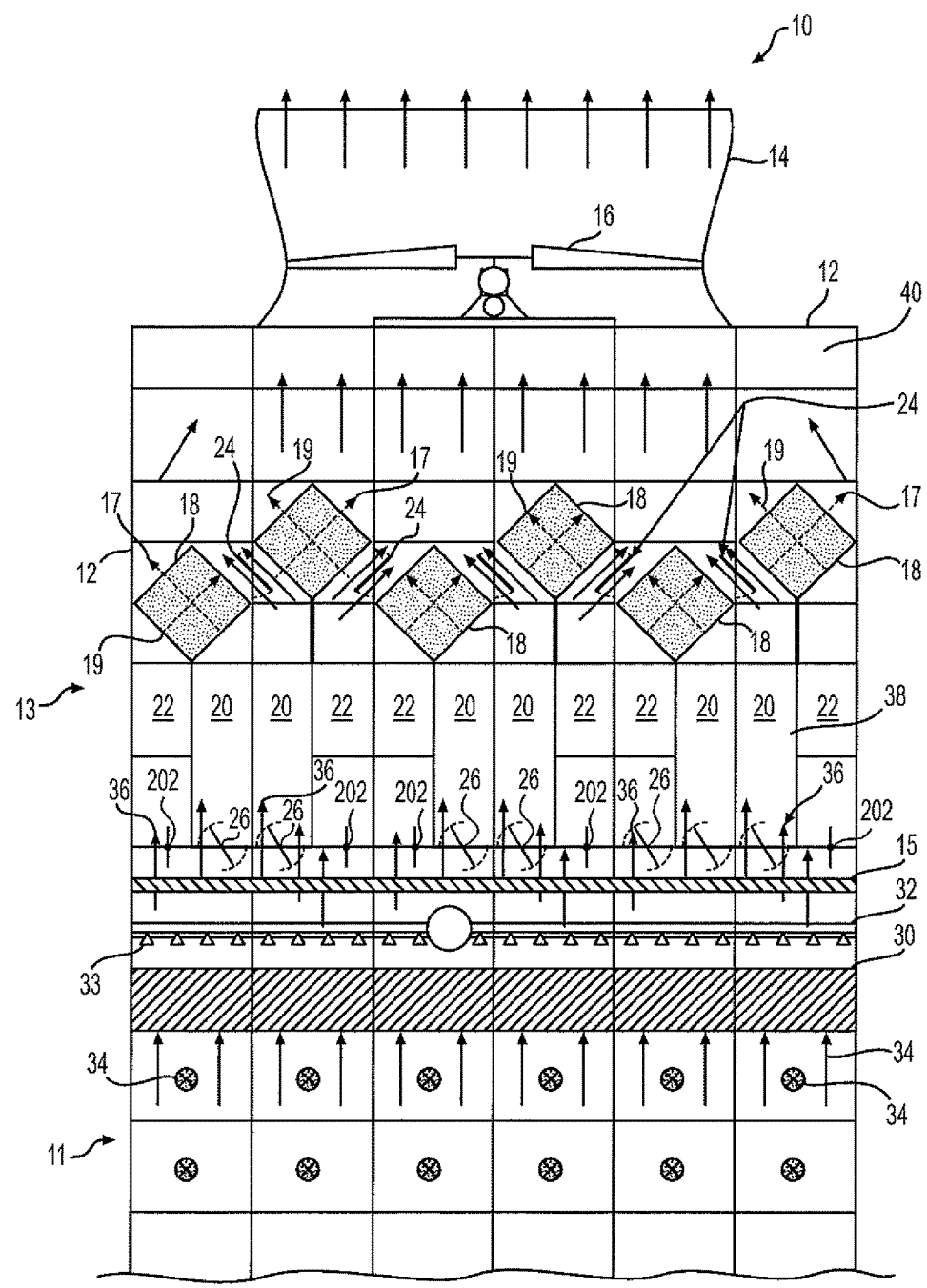
FIG. 1 is a schematic view of a cooling tower in a maximum thermal performance mode in accordance with an embodiment of the invention.
Figure 2:
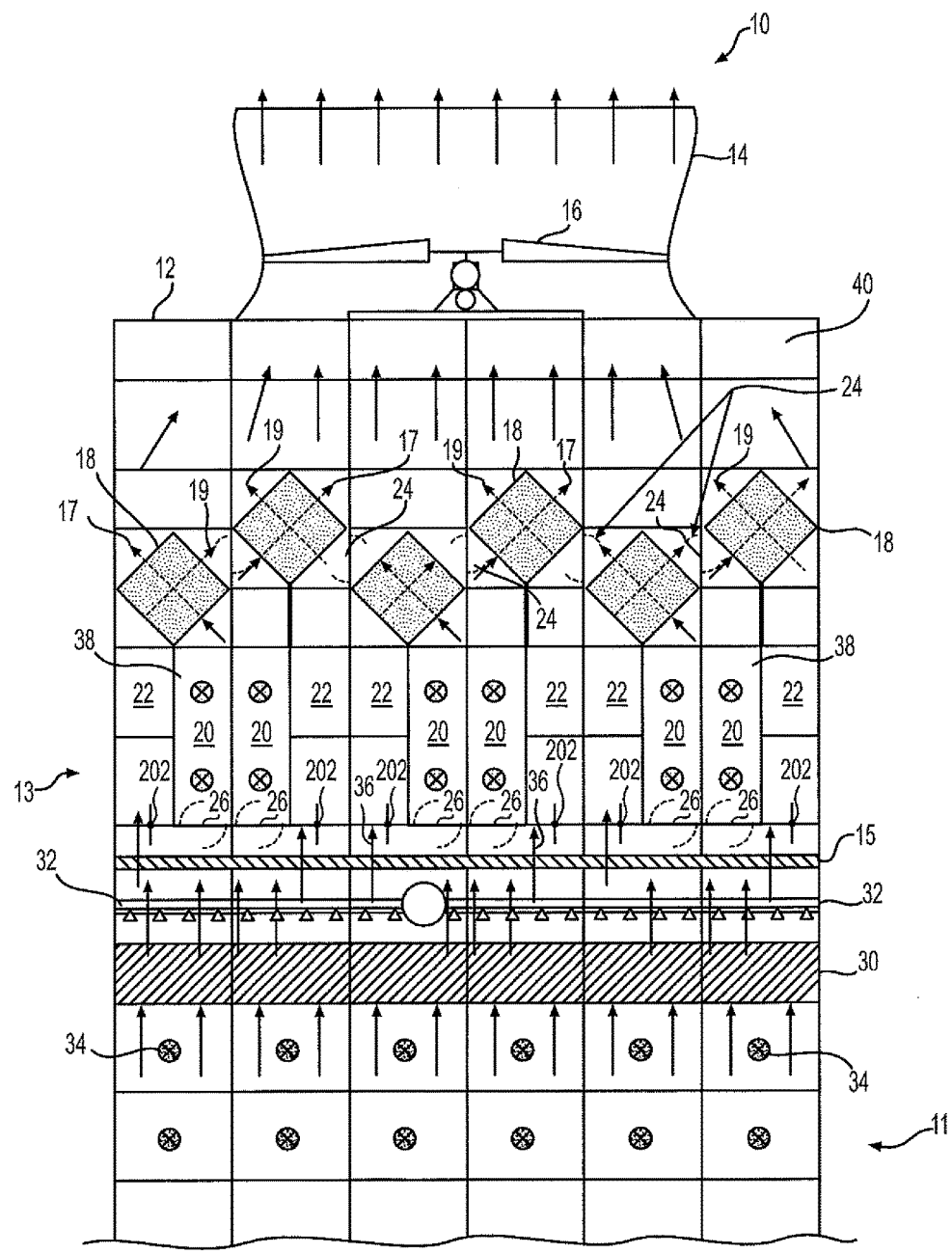
FIG. 2 is a schematic view of the cooling tower depicted in FIG. 1 in a plume abatement mode in accordance with an embodiment of the invention.
Figure 3:
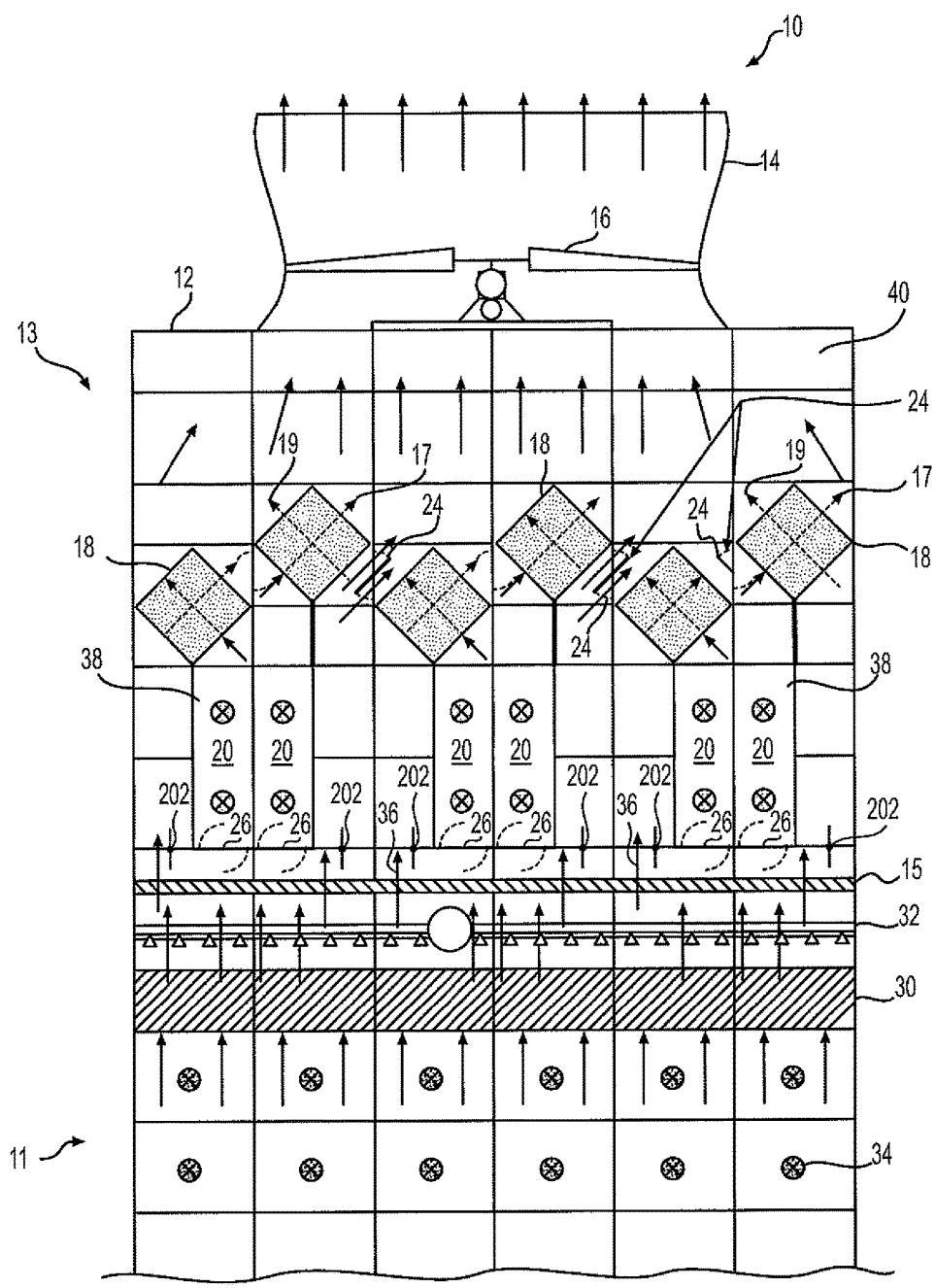
FIG. 3 is a schematic view of the cooling tower depicted in FIG. 1 and in a partial plume abatement mode in accordance with an embodiment of the invention.

Referring now to the figures wherein like reference numerals indicate like elements, FIGS. 1-3 depict a cooling tower apparatus, generally designated 10 having a support frame assembly 12 and a shroud 14 within which an air current generator (axial fan) 16 operates. The cooling tower 10 is generally comprises a wet, direct cooling section 11 and a dry, indirect cooling section 13 that are separated by an eliminators 15. The cooling tower 10 includes a plurality of heat exchanges modules 18 positioned and oriented in a series, each in fluid communication with dry air ducts 20 and wet air ducts 22. The individual exchanger modules 18 preferably have a generally diamond shape or diamond configuration however may alternatively be any functional geometry. As previously discussed, cooling tower 10 also includes a series of ambient or dry air ducts 20 each having air inlets or dampers 38, along with a series of warm air or wet air ducts 22 through which warm, moist air, or effluent, travels. The ambient air ducts 20 connect to the individual exchanger pack modules 18 as illustrated, so that the air ducts 20 are in communication with the path 17 through of the exchanger module, as indicated by the arrows. The warm air ducts 22 are also connected to the individual exchanger modules as illustrated, however the warm air ducts 22 are in communication with the separate paths 19. The paths of the passageways 17, 19 may flow wet air of effluent through the individual heat exchange modules. Both the ambient air ducts 20 and warm air ducts 22 are positioned below the heat exchanger modules 18. For convenience a duct is defined as supplying one air path to one module, e.g., the cooling towers bays may be walled off or partitioned. Two adjacent modules may be supplied by one common duct. However, the modules may also be arranged to alternate wet and dry air paths every half bay. For example in FIG. 1 the ducts are labeled from left to right 22, 20, 20, 22, 22, 20, 20, 22, 20, 20, and 22. Alternatively they could be partitioned such that the labels would read from left to right 22, 20, 22, 20, 22, 20, 22, 20, 22, 20, 22, and 20.

Referring now specifically to the to heat exchange modules 18, in one embodiment of the present invention, each module is a vapor condensing heat exchanger pack. Each heat exchanger module 18 is constructed of thin sheets that are bonded together to form a pack that has a first path 17 and a second path 19 for two different air streams. In a preferred embodiment, the two air streams enter each heat exchanger module 18 at right angles to each other and are kept separate by the thin sheets.

The thin sheets are a relatively thin synthetic resin material that are shaped to assist in condensing vapor from a heated water laden air stream passing through passageways 19 and transferring heat to a cool air stream passing through passageways 17. In a preferred embodiment, the material is 0.005 to 0.040 inches in thickness but is preferably 0.015 to 0.020 inches in thickness. The surface may be textured to provide extended surface area presented to each of the air streams with a minimal amount of resistance to the air stream flow. Other texture patterns may include but not be limited to textures such as dimples similar to golf ball texture and girded texture similar to a screen pattern embossed in the plastic sheet. This increased surface area enhances the heat transfer capabilities of the thin sheet and increases the velocity fluctuations near the sheet surface, which improves the local mixing of the individual air stream. The increased fluctuations and resulting local mixing of the air stream also improves the heat transfer capabilities of the sheet.

As depicted, each of the heat exchange modules 18 are offset from one another whereby adjacent modules 18 vary in elevation such that adjacent points of said modules are substantially separated. As illustrated in FIGS. 1-3, the cooling tower 10 also includes a series of air bypass doors 24 positioned between adjacent heat exchange modules. While five air bypass doors are depicted, more or less bypass doors 24 may be employed depending upon the size of the tower 10. Also illustrated in FIG. 1, a series of series of dry duct vent doors, generally designated 26 are located at the bottom of each respective dry duct 20, which operate to control the flow of warm effluent into said ducts 20.

As illustrated in FIGS. 1-3, and previously mentioned, the indirect heat exchange modules 18 are located in the indirect cooling section 13 above the direct cooling section 11 which comprises the evaporative media 30 such as fill sheets or any heat exchange media or the like in a counterflow arrangement as illustrated. The direct evaporative section 11 further includes a hot water distribution system 32 that includes a series of conduits and nozzles 33 through which hot water flows. During operation, cool dry air, as represented by the cooling air vectors 34 enters the cooling tower below the evaporative media 30.

Turning now specifically to FIG. 1, the cooling tower 10 is illustrated in the maximum thermal performance operation mode or position. By maximal thermal performance, it is understood that the heat exchange modules 18 are offset from one another whereby adjacent modules vary in elevation such that adjacent points of said modules are substantially separated as previously described. In said maximum thermal performance position, each of the bypass doors 24 is open, and similarly each of the vent doors 26 is open while the dry dampers 38 are closed.

Accordingly, during operation in this maximum thermal performance mode, hot water from the heat source is pumped through a conduit and to the spray nozzles 33 and sprayed over the evaporative media 30. Meanwhile the axial fan (or fans) 16 draw airflow of cool ambient air as indicated by the vectors and arrows 34 through the evaporative media 30. In the evaporative media 30, the air is heated and moisture is evaporated into the air stream. The heated water laden air is then directed through the dry and wet air flow ducts 20, 22 as indicated by the arrows 36. In this mode ambient air is restricted from entering tower 10 via the dry ducts 20 as the dry dampers 38 are closed.

As illustrated by the arrows 36, the heated water laden air enters and flows through both the dry air ducts 20 and the wet air ducts 22. Open bypass doors 24 permit a portion of heat water laden air 36 from ducts 20 and 22 to avoid traversing through heat exchange modules 18. More specifically, the air or effluent bypassing the heat exchange modules 18 reduces the amount of air that must pass through the heat exchanger modules 18 and therefore the air velocity through each module 18 is less and the resulting pressure drop is less. Furthermore, since the air passing through the bypass doors 24 and the heat exchange modules 18 enter into a common plenum 40, the velocities through the doors 24 and through the modules 18 will adjust to provide a common pressure drop.

Turning now specifically to FIG. 2, the cooling tower 10 is in plume abatement mode, or partial to the maximum performance mode depicted in FIG. 1. By plume abatement mode, it is understood that the air bypass doors 24 are closed along with the dry duct vent doors 26 while the dry dampers 38 are partially or fully opened. During operation, the direct heat exchange section 11 operates similarly as discussed in connection with the maximum thermal mode illustrated in FIG. 1. As the heated water laden air or effluent passes through the eliminators 15 and enters the indirect heat exchange section 13, the vent doors are closed forcing the effluent airflow through the wet ducts 22 and into the heat exchange modules 18. As previously mentioned, the dampers are partially or fully opened and as the effluent then proceeds through the wet ducts 22 and enters one of the previous described air flow passages 19 of the heat exchange modules 18. Meanwhile, as previously described, ambient, dry air enters the dry air ducts 20 via the dampers 38 to generate the second air stream. The ambient, dry air is then directed through separate air flow passages 17 of the heat exchanger modules 18, preferably perpendicular to the flow of the effluent. The ambient, dry air functions to generate a cool surface on the heat exchanger modules 18, allowing heat to transfer from the first air stream to the second air stream. The ambient, dry air also provides a cool surface on the heat exchanger modules 18 for water vapor from the effluent or first air stream to condense on. The condensate from the effluent may then fall from the exchanger modules 18 of the heat exchange cooling section of the cooling tower. As the two air streams exit the exchange modules 18, they are combined in the plenum 40 and exit via the shroud 14.

In this mode, the dry dampers 38 on the entrance to the dry air ducts 20 can be fully opened to maximum plume abatement or may be throttled to reduce dry air intake and increase wet section 11 airflow. However, as the ambient temperature rises, the cooling may not be sufficient, but some plume abatement may still be desirable.

Turning now to FIG. 3, the cooling tower 10 is illustrated in the a partial plume abatement position wherein in the position provides more wet section 11 performance as compared to the position illustrated in FIG. 2, while still providing plume abatement. Whereas both the air bypass doors 24 and the dry duct vent doors 26 are closed in the orientation illustrated in FIG. 2, the air bypass doors 24 in the wet ducts are open while the dry duct doors 26 and the air bypass doors 24 in the dry ducts are closed in the partial abatement mode illustrated in FIG. 3. The dry dampers 38 on the entrance to the dry air ducts can be fully opened to maximum plume abatement or may be throttled to reduce dry air intake and increase wet section airflow. However, as the ambient temperature rises, the cooling may not be sufficient, but some plume abatement may still be desirable. Specifically, in this mode, the dry ambient air flows through the dry ducts 20 and through passages 17 of the heat exchange modules 18 and a portion of wet effluent bypasses the heat exchange modules 18 due to the bypass doors 24 being opened while the rest of the wet effluent flows through passages 19. Again, the bypassing effluent permits the overall pressure loss through the different air paths to be reduced. Airflow through the wet section is increased which enhances thermal performance.

Figure 4:
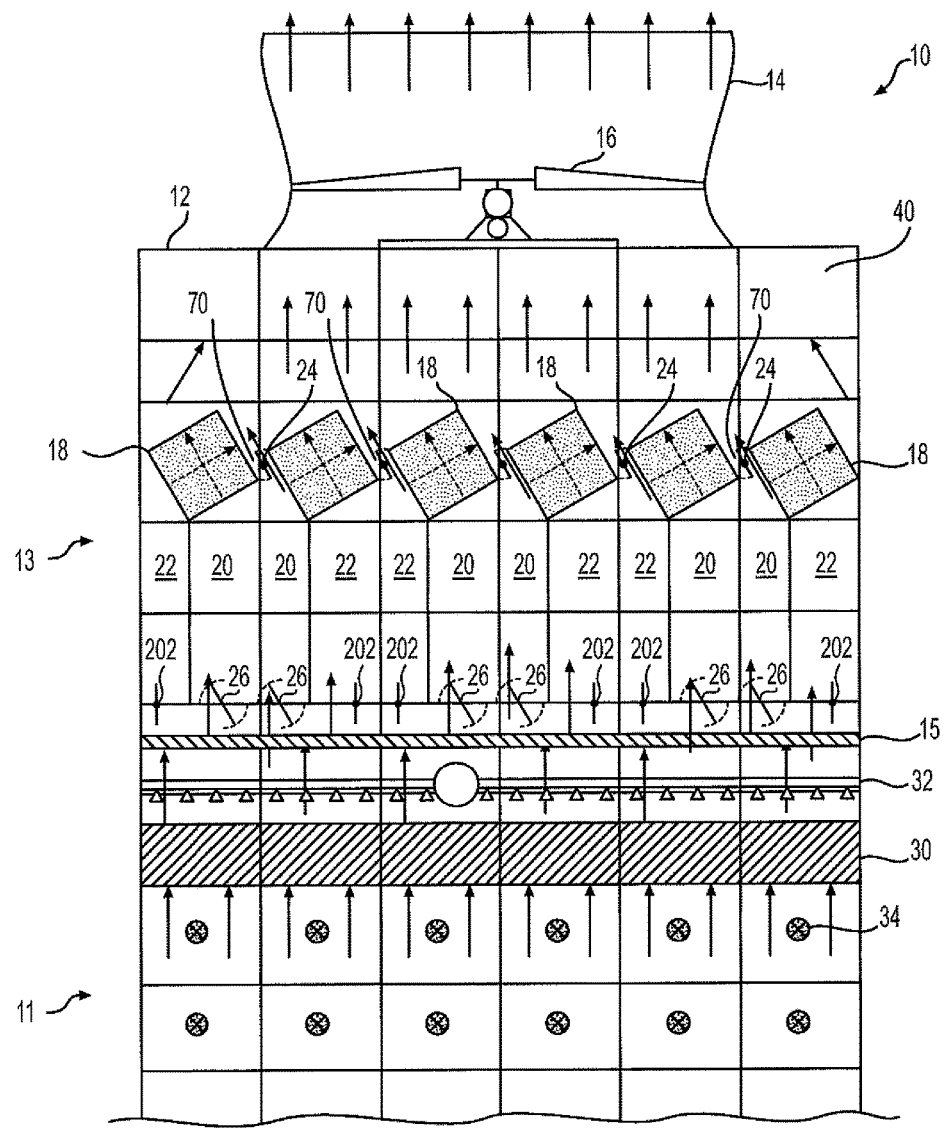
FIG. 4 is a schematic view of a cooling tower in accordance with an alternative embodiment of the invention.

Referring now to FIG. 4, an alternative embodiment of the present invention is illustrated. As depicted, the cooling tower 10 is very similar in its operation and function to those embodiments disclosed and described in connection with FIGS. 1-3, however in this alternative embodiment the modules 18 are positioned at the same elevation. As illustrated in FIG. 4, rather than raising the elevation of alternating heat exchanger modules 18 to create space there between adjacent points of said modules 18, the modules 18 are alternatively rotated to separate adjacent modules 18 creating bypass pathways 70 which are controlled by the bypass doors 24. Alternatively, the bay spacing could be increased to create a space between the diamonds without requiring the diamonds to be rotated. The space between diamonds could then be fitted with bypass doors.

Figure 5:
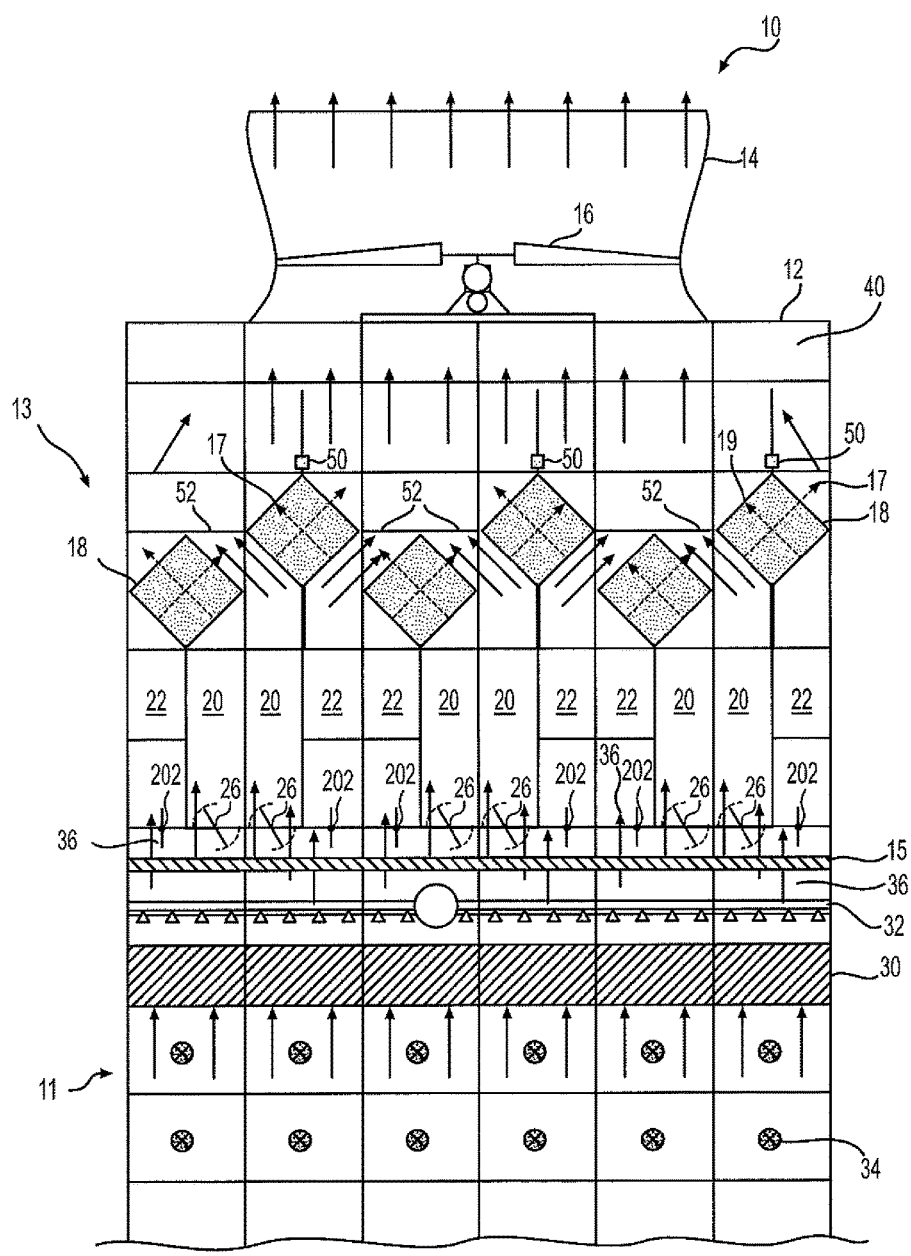
FIG. 5 is a schematic view of a cooling tower wherein the heat exchange modules are mechanically raised in accordance with an alternative embodiment of the present invention.
Figure 6:
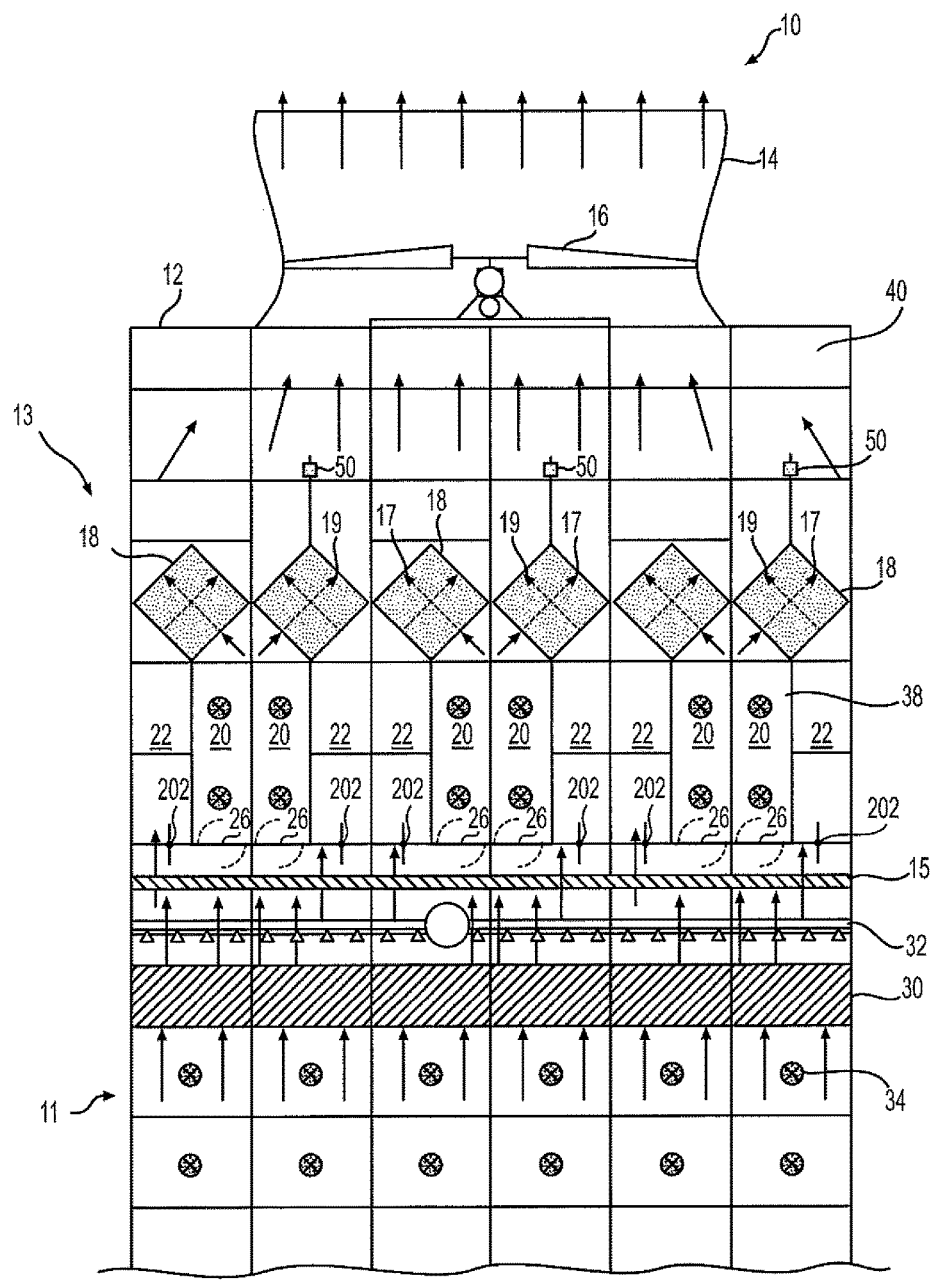
FIG. 6 is a schematic view of the cooling tower depicted in FIG. 5 wherein the heat exchange modules are mechanically lowered in accordance with an alternative embodiment of the present invention.

Turning now to FIGS. 5 and 6, another alternative embodiment of the present invention is depicted wherein the heat exchange modules 18 are mechanically raised and lowered via a mechanical linear lifting device 50. The lifting device 50 may be a driven rod, screw jack, block and tackle, hydraulic cylinders or any other apparatus that allows for the elevation of the modules 18 to be modified. FIG. 5 depicts the cooling tower 10 in the maximum thermal mode wherein alternating modules 18 are raised such that the modules 18 are positioned at differing elevations creating the bypass paths 52. In this mode, the dry air dampers 38 are closed while the dry duct vent doors 26 are open allowing the effluent to bypass the modules 18 and accordingly providing maximum thermal performance.

Alternatively, FIG. 6 illustrates the cooling tower in plume abatement mode wherein the modules 18 are positioned at the same elevation, blocking the bypass paths. In this mode, the dry duct vent doors 26 are closed while the ambient air dampers 38 are open allowing the flow of cool air through the dry ducts 20 and into passages 17 of the modules while the wet effluent flows though the wet duct only 22 through the other of the passages 19.

Figure 7:
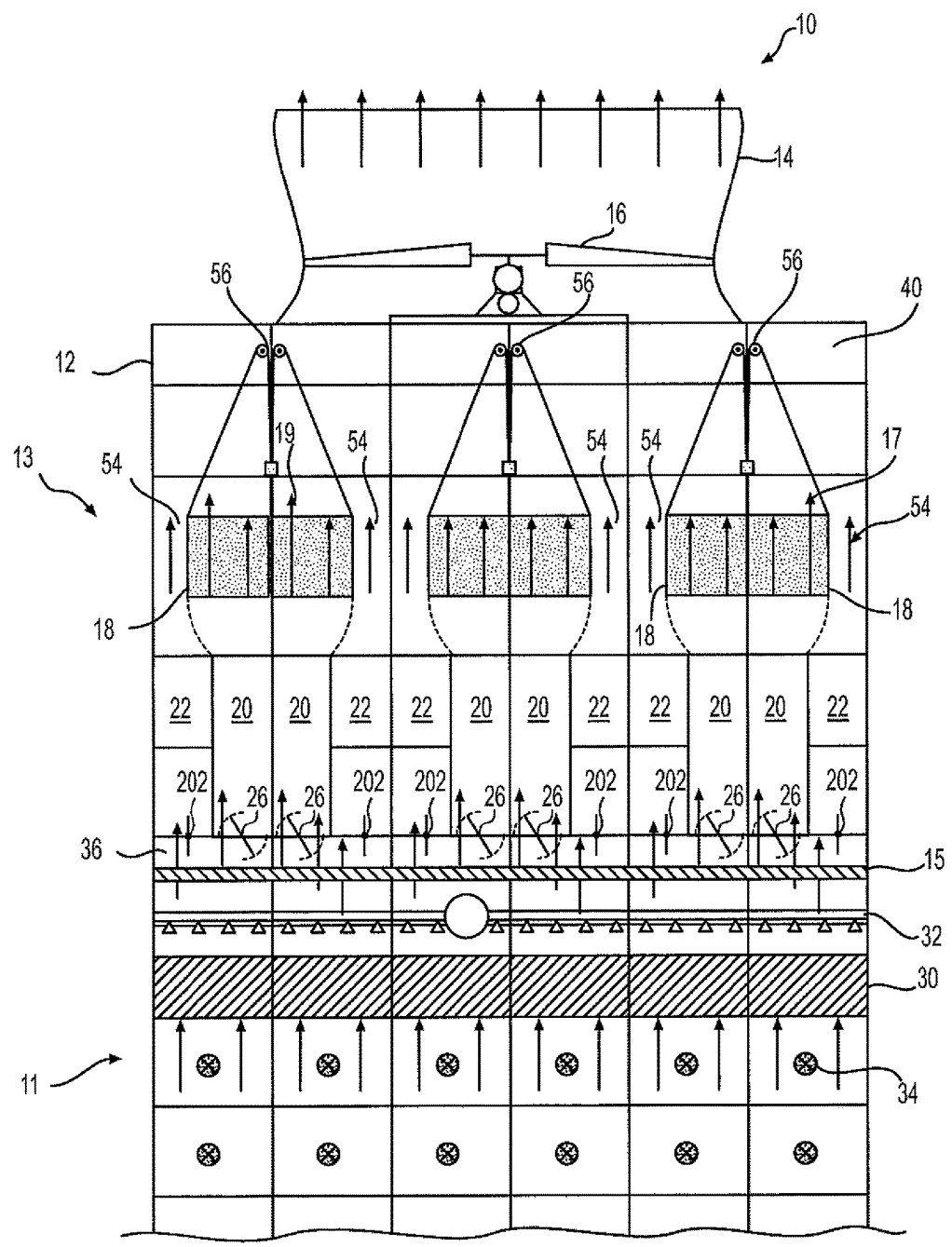
FIG. 7 is a schematic view of a cooling tower wherein the heat exchange modules are mechanically rotated in accordance with an alternative embodiment of the present invention.
Figure 8:
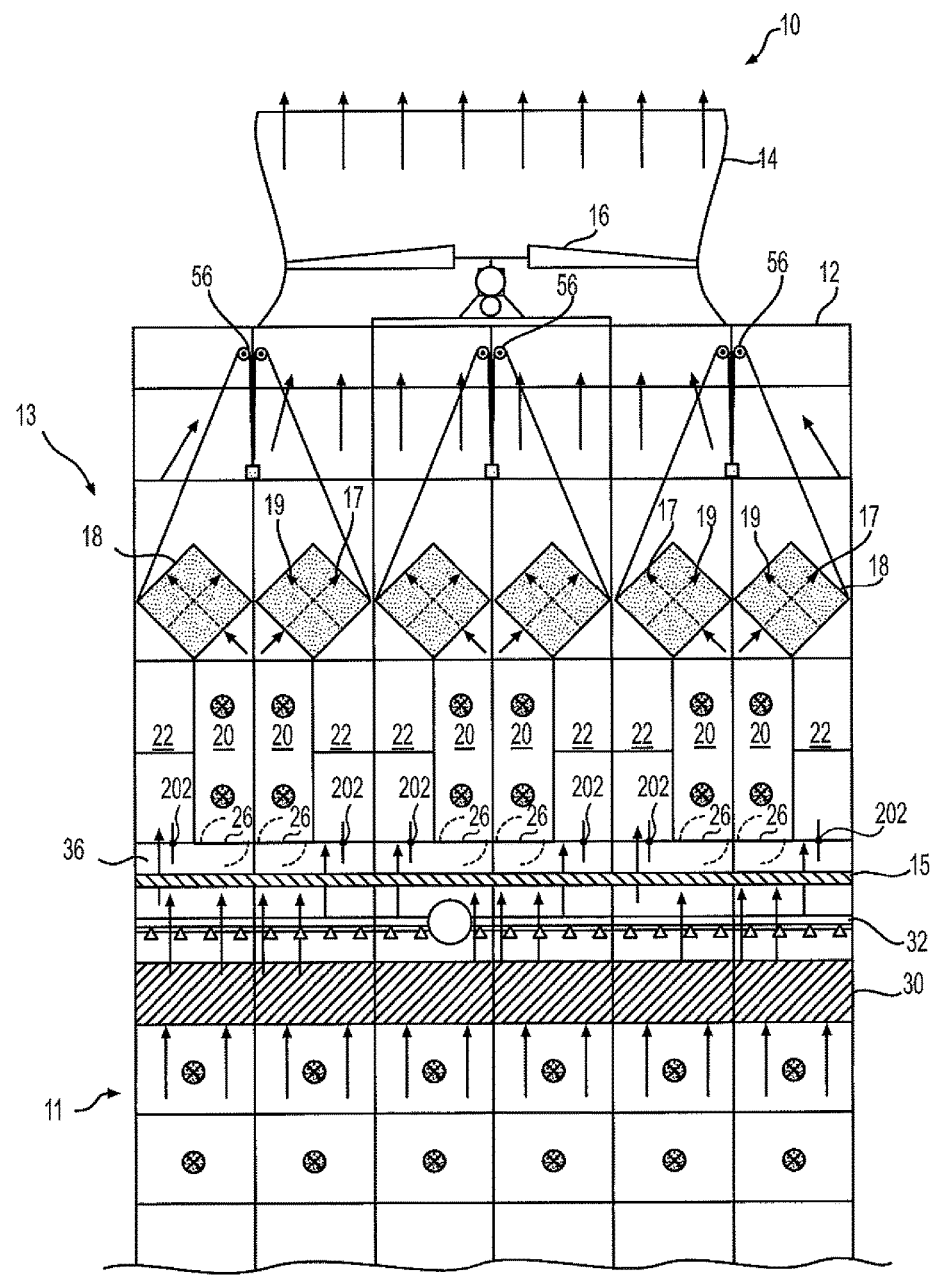
FIG. 8 is a schematic view of a cooling tower depicted in FIG. 7, wherein the heat exchange modules are mechanically rotated in accordance with an alternative embodiment of the present invention.

Turning now to FIGS. 7 and 8, yet another alternative embodiment of the present invention is depicted. This embodiment is similar to that which is illustrated in FIGS. 5 and 6, however instead of moving or translating the heat exchanger modules 18 to different elevations, the modules 18 are rotated to create a bypass route 54. As illustrated in FIGS. 7 and 8, the cooling tower 10 has a lifting mechanical system 56 such as a cable, sheave and linear lifting device. As illustrated in FIG. 7, the cooling tower 10 is in the maximum thermal performance mode whereby the heat exchanger modules 18 are rotated upward to provide the bypass path 54.

FIG. 8 alternatively illustrates the cooling tower in the plume abatement mode whereby the modules 18 have been rotated downwardly such that the adjacent points are in close proximity, closing the bypass and forcing the wet effluent to flow through the respective modules while the open dampers 38 allow for the flow of dry ambient air through the dry air ducts 20 and into the modules.

Some applications for cooling towers may have a diminished heat load during the cold or winter months of the year. For example, air conditioning systems of buildings may have significantly lower heat load in the winter months as compared to the summer months. Moreover, many processes have minimum cold water temperature limits often called set points. Accordingly, the cold water temperature must be kept at or above the aforementioned set point.

In the example of an air conditioning system, the chillers often have set points at 50° F. In freezing climates, an implicit minimum cold water temperature is somewhat above freezing, e.g., 40° F., regardless of the process to avoid ice formation in the cooling system. On very cold days, cooling must be restricted to maintain the minimum set point. This may be accomplished by employing a mechanism, such as the wet dampers of the present invention, that diminish wet section air flow while maintaining or ideally increasing dry air flow.

Figure 9:
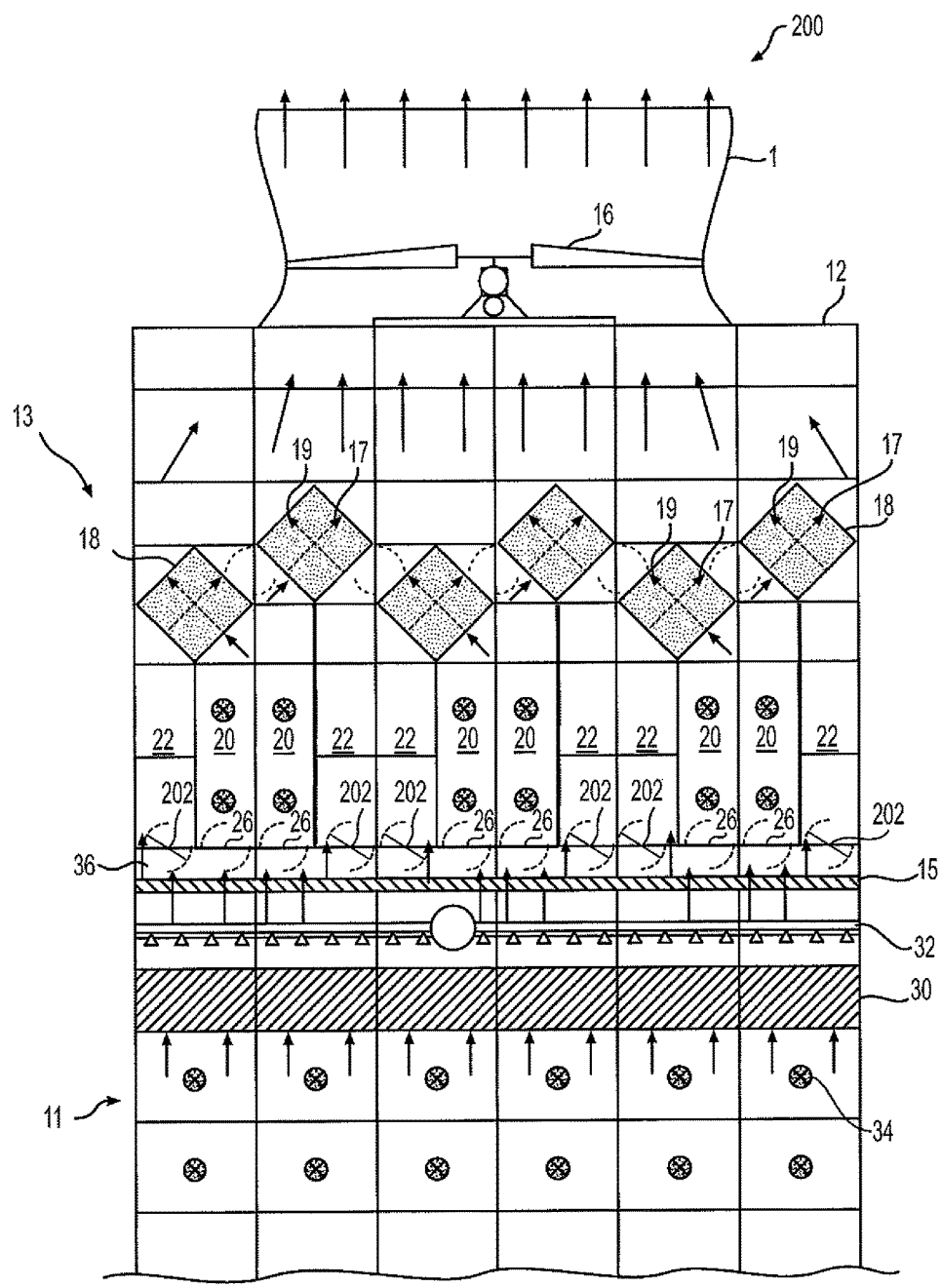
FIG. 9 is a schematic view of a cooling tower in accordance with an alternative embodiment of the present invention having wet duct dampers.
Figure 10:
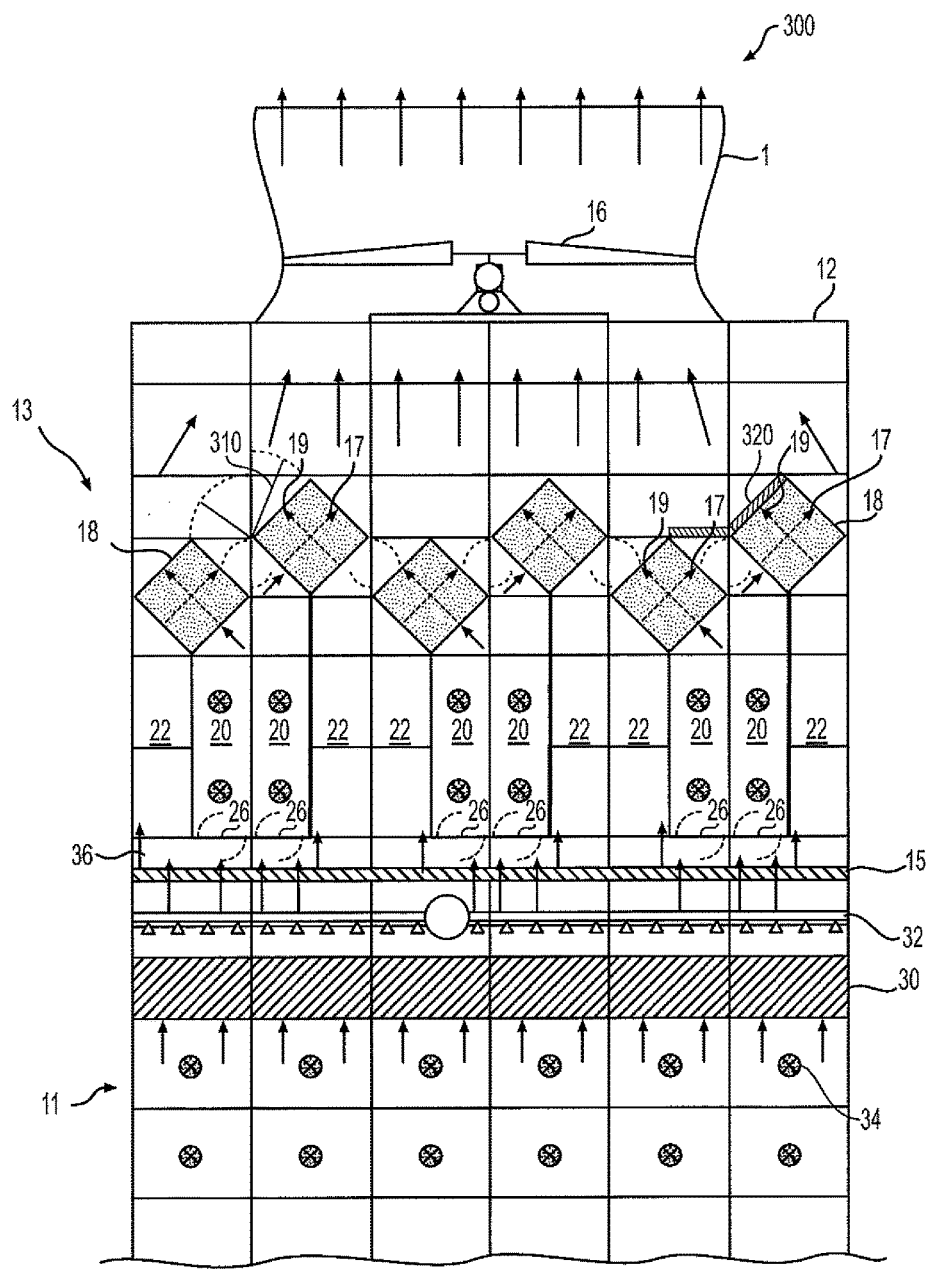
FIG. 10 is a schematic view of a cooling tower in accordance with another alternative embodiment of the present invention having wet duct dampers positioned at the heat exchange modules.

Turning now to FIGS. 9 and 10, alternative embodiments of the present invention are depicted wherein cooling towers are illustrated having wet section damper doors. It is noted that while dampers will be discussed in detail in connection with the embodiments illustrated in FIGS. 9 and 10, the wet dampers may be employed in each of the embodiments depicted in FIGS. 1-8, as needed or as application warrants. As illustrated in FIGS. 1-8, damper doors 202, which restrict wet section air flow, are employed.

Turning now to FIG. 9, a cooling tower, generally designated 200, is illustrated having wet duct damper doors 202 that control the air flow traversing through the wet ducts 22. The tower 200 depicted in FIG. 9 is similar to that illustrated in FIG. 2 except that the wet duct damper doors 202 have been partially closed.

During normal operation, as illustrated in FIG. 2 for example, the wet duct damper doors 202 are operated in the open position so as not to significantly restrict air flow traversing through the wet ducts 22. In the event that the cold water temperature is in danger of falling below the above described set point, the wet duct damper doors 202 may be partially closed, adding resistance to the wet air path, thus diminishing the wet air flow. As the ambient web bulb temperature gets colder, the wet duct damper doors 202 may be incrementally adjusted toward the closed position, thus further restricting wet air flow and maintaining the cold water set point temperature.

As can be seen in FIG. 9, the wet duct damper doors 202 are shown at the same elevation as the dry duct vent doors. This is a preferred arrangement in particular if a service walkway along the side of the tower is provided. However, alternative arrangements and orientations may be employed wherein the wet duct damper doors 202 may be positioned or located anywhere within the duct or even above to the wet path discharge of the air-to air heat exchangers. Likewise the wet duct damper doors 202 could be located below the wet ducts 22.

Now turning to FIG. 10, where damper doors 310 are located on top of the air-to-air heat exchangers, they may serve as flow directional baffles to help with mixing wet and dry air streams. Similar to the embodiment depicted in FIG. 9, where the wet duct dampers have been partially closed, this concept also applies to the configurations shown in FIGS. 6 and 8. By partially closing the wet dampers to impede flow in wet ducts 22, wet cooling is reduced and the likelihood of the temperature falling below the minimum cold water temperature (set point) is minimized.

In FIG. 10, dampers 320 similar to the dry air duct dampers in the figures which are so called louver or blade type dampers may be used. Another alternate embodiment is hinged doors on the wet air path discharge side of the air-to-air heat exchanger.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A cooling tower having a vertical axis, comprising:
   an evaporative media located at a first position along the vertical axis;
   a liquid distribution system that distributes hot liquid over said evaporative media;
   a first heat exchanger module having a first set of passageways in fluid communication with a first flow duct and a second set of passageways in fluid communication with a second flow duct, wherein said first air flow duct has a first wet air flow that traverses through said first heat exchanger and wherein said second air flow duct has a first dry ambient air flow;
   a second heat exchanger module having a third set of passageways in fluid communication with a third flow duct and a fourth set of passageways in fluid communication with a fourth flow duct, wherein a third air flow duct has a second wet air flow that traverses through said second heat exchanger and wherein said fourth air flow duct has a second dry ambient air flow;
a first wet path damper disposed in said first flow duct that regulates flow through said first flow duct, wherein said first wet path damper is located between said evaporative media and said first heat exchanger module; and
an air current generator that directs air through said flow ducts and said passageways.

2. The cooling tower according to claim 1, further comprising a first bypass flow path that extends between said first heat exchanger module and said second heat exchanger module.

3. The cooling tower according to claim 2, wherein said first heat exchanger module has a diamond geometry and said second heat exchanger module has a diamond geometry.

4. The cooling tower according to claim 2, wherein said first heat exchanger module is located at a second position along the vertical axis and wherein said second heat exchanger module is located at a third position along the vertical axis above said second position.

5. The cooling tower according to claim 4, wherein said second and third positions are located vertically above said first position along the vertical axis.

6. The cooling tower according to claim 2, further comprising:
a second bypass flow path that extends between said second heat exchanger module and a wall of the cooling tower; and
a second bypass door positioned in said second bypass flow path.

7. The cooling tower according to claim 2, wherein said evaporative media is a counterflow evaporative media.

8. The cooling tower according to claim 1, further comprising a second wet path damper disposed in said third flow duct that regulates flow through said third flow duct wherein said second wet path damper is located between said evaporative media and said second heat exchanger module.

9. The cooling tower according to claim 1, wherein said first heat exchanger module is located a second position along the vertical axis and said second heat exchanger module is located at said second position along the vertical axis.

* * * * *